United States Patent [19]

Jordens et al.

[11] Patent Number: 5,118,087
[45] Date of Patent: Jun. 2, 1992

[54] SLEEVE RUBBER SPRING WITH HYDRAULIC DAMPING FOR MOUNTINGS IN MOTOR VEHICLES

[75] Inventors: Ernst-Günter Jordens, Damme; Rüdiger Sprang, Eltville; Andreas Vossel, Osnabrück, all of Fed. Rep. of Germany

[73] Assignee: Lemforder Metallwaren AG, Lemforde, Fed. Rep. of Germany

[21] Appl. No.: 582,652

[22] Filed: Sep. 13, 1990

[30] Foreign Application Priority Data

Sep. 14, 1989 [DE] Fed. Rep. of Germany ....... 3930742

[51] Int. Cl.$^5$ .................................... F16F 5/00
[52] U.S. Cl. ............................. 267/140.1 C; 248/562
[58] Field of Search .......... 267/35, 140.1 C, 140.1 R, 267/141.2, 141.3, 141.4, 141.5; 248/562, 636; 180/300, 312

[56] References Cited

U.S. PATENT DOCUMENTS

| | | | |
|---|---|---|---|
| 4,768,760 | 9/1988 | Le Fol | 267/140.1 C |
| 4,919,401 | 4/1990 | Yano | 267/140.1 C |
| 4,982,938 | 1/1991 | Brenner | 267/140.1 C |

FOREIGN PATENT DOCUMENTS 0353700 2/1990 European Pat. Off. .
3731004 3/1988 Fed. Rep. of Germany .

*Primary Examiner*—Robert J. Oberleitner
*Assistant Examiner*—Peter M. Poon
*Attorney, Agent, or Firm*—McGlew & Tuttle

[57] ABSTRACT

The sleeve rubber spring consists of an inner mounting sleeve (1), an outer mounting sleeve (2) surrounding the inner mounting sleeve at a radially spaced location, and a rubber body (3) arranged rigidly adhering between the two mounting sleeves. The rubber body forms at least two chambers (5, 6) are formed, which are filled with damping medium and permanently communicate with each other. An elastically deformable body forms a protective tube (4), into which the inner and outer mounting sleeves (2) are sealingly inserted. An overflow channel (8) with a shut-off device, which opens automatically at a predetermined pressure differential in the two chambers (5, 6) by radial deformation of the protective tube (4), is provided between the chambers (5, 6).

4 Claims, 7 Drawing Sheets

SLEEVE RUBBER SPRING WITH HYDRAULIC DAMPING FOR MOUNTINGS IN MOTOR VEHICLES

The present invention pertains generally to a sleeve rubber spring with hydraulic damping for mounting parts in a motor vehicle, and more particularly to a sleeve rubber spring with hydraulic damping including an inner mounting sleeve, an outer mounting sleeve surrounding the inner mounting sleeve at a radially spaced location and a rubber body arranged between the inner and outer mounting sleeves.

Such a sleeve rubber spring is known from West German Offenlegungsschrift No. DE-OS 38,10,309. In this arrangement, the chambers filled with the damping medium are formed by depressions on the circumference of the rubber body, which is vulcanized onto the inner mounting sleeve and is covered by the outer mounting sleeve. Sealing is achieved with an outer protective tube, into which the outer mounting sleeve is inserted. In this case, a throttle channel or possibly a plurality of throttle channels permanently connect(s) two chambers. Introduced vibrations with small amplitudes are thus damped in application-specific frequency ranges. To avoid an undesirable stiffening of the elasticity of the mounting, the above-mentioned West German Offenlegungsschrift No. DE-OS 38,10,309 as well as U.S. Pat. No. 4,768,760 disclose, in addition to the above-mentioned throttle channel, at least one overflow channel with a shut-off device, which overflow channel is arranged between the chambers filled with the damping fluid and opens only at a predetermined pressure differential between the chambers, so that these damping means act only at greater displacements and prevent dynamic stiffening of the mounting system, i.e., they more softly absorb stochastically occurring forces. To achieve this, a valve consisting of a loose valve body and a valve seating surface in the channel is provided in the overflow channel in the design according to West German Offenlegungsschrift No. 38,10,309. Such a valve opens when a predetermined pressure differential between the two chambers is exceeded, but it does not adapt itself to stochastic amplitude changes.

The design of fixed throttling strips in a throttle channel is known from U.S. Pat. No. 4,768,760 which is hereby incorporated by reference.

SUMMARY AND OBJECTS OF THE INVENTION

It is an object of the present invention to provide an inexpensive design of a sleeve rubber spring made of the smallest possible number of parts without mechanical processing and complicated assembly for long service life and high reliability of operation.

This task is accomplished according to the present invention by designing a sleeve rubber spring including an inner mounting sleeve, an outer mounting sleeve surrounding the inner mounting sleeve at a radially spaced location and a rubber body arranged between the inner and outer mounting sleeve, the rubber body being adhered to at least one of the inner and outer mounting sleeve. The rubber body cooperates to define two chambers filled with hydraulic damping medium. The chambers are formed to be permanently in communication with one another through a first throttle channel. An additional, over flow, channel is provided with a shutoff device. The shutoff device opens the overflow channel only at upon a predetermined pressure differential being exceeded in the chambers. A protective tube is provided into which the outer mounting sleeve is sealingly inserted. The protective tube is fixed at its ends and is designed to be radially deformable in the area of the overflow channel. Radial deformations of the protective tube thereby bring about the opening of the shut-off device in the overflow channel.

Such a sleeve rubber spring has no loose individual parts and consequently it does not require any assembly operations. High reliability of operation is achieved by the absence of parts that are able to move relative to one another and by releasing the overflow channel in the case of great amplitudes of the vibrations to be damped by elastic deformation of the outer protective tube, wherein the extent of these elastic deformations is inherently determined by the amplitudes of the vibrations that occur. This is a considerable advantage over the prior-art designs. The exchange of fluid between the two chambers via the overflow channel takes place spontaneously, depending on the amplitude of the vibrations occurring. This is achieved by radial deformations of the protective tube, whose deformation characteristics can be influenced by corresponding cross section profiling of its wall. In the case of a sleeve rubber spring according to the present invention, only a breathing movement of the protective tube takes place, in the form of elastic widening of the protective tube in the radial direction and return into the starting position as a result of the elastic stresses of the material. This ensures that the operation of the sleeve rubber spring remains reliable over a long service life.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 5:
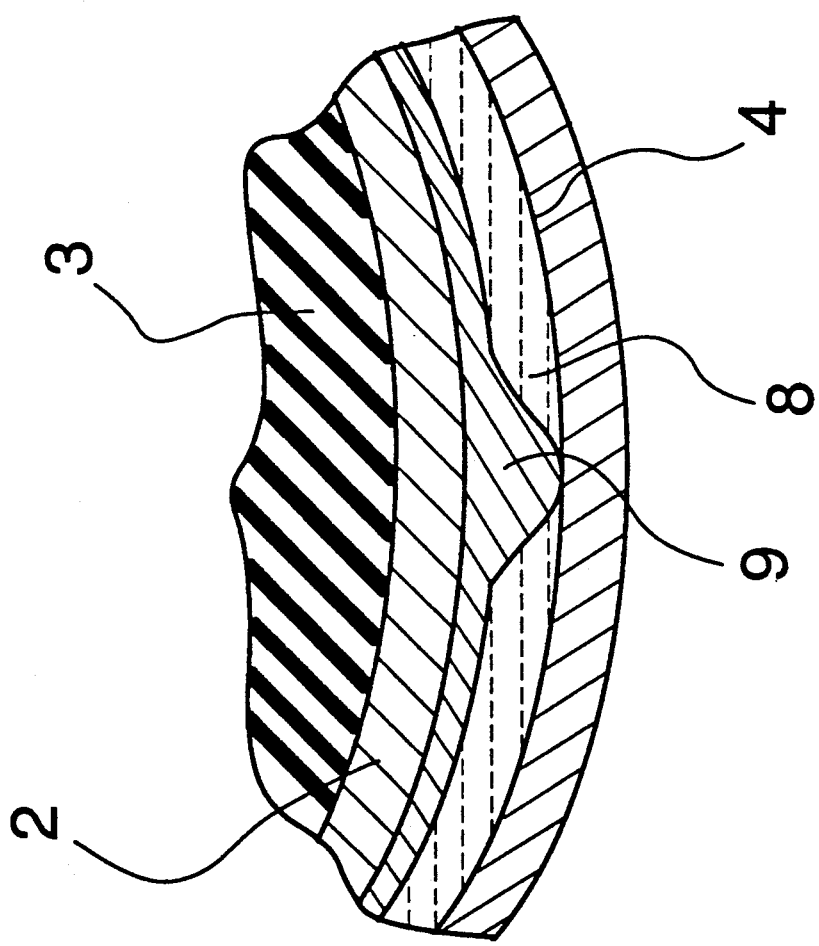
FIG. 5 is a detailed view of the structure shown in circle X in FIG. 3, shown on a larger scale.
Figure 6:
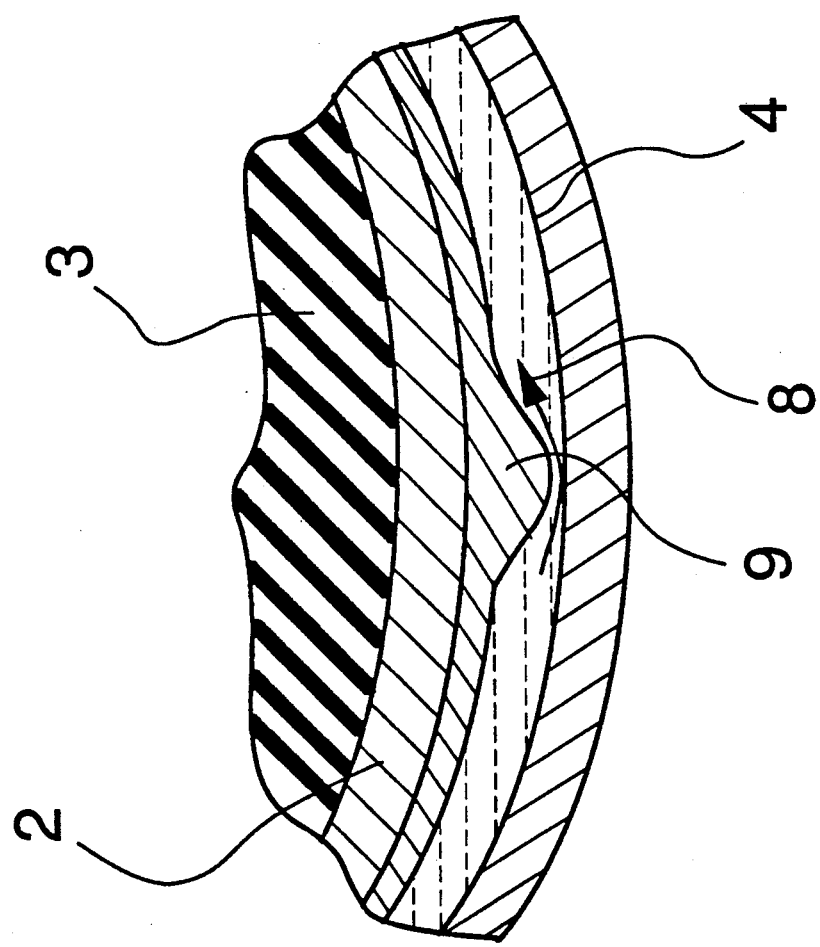
FIG. 6 is a modified design of detailed view of the structure shown in circle X in FIG. 3 on the same scale as in FIG. 5.

The essential parts of the sleeve rubber spring include the inner mounting sleeve 1, the outer mounting sleeve 2 surrounding the inner mounting sleeve 1 at a spaced location. The rubber body 3 is arranged between these two mounting sleeves. The rubber body 3, is rigidly connected to at least one mounting sleeve. The outer protective tube 4, sealingly surrounds the outer mounting sleeve 2. In the exemplified embodiment, two chambers 5 and 6 arranged diametrically to the center line of the sleeve rubber spring are provided, which are filled with a hydraulic damping fluid and are permanently connected through a throttle channel 7. Said throttle channel 7 is designed and dimensioned as a function of the friction or throttling losses as well as the damping and mass effects of the damping fluid used. Metal sleeves are preferably used for said mounting sleeves 1 and 2. In contrast, said protective tube 4 may consist of metal or plastic. Besides one or more throttle channels 7, another overflow channel 8 is provided; the overflow channel 8 has a shut-off device that is closed under the static load of the sleeve rubber spring. Only when a predeterminable pressure differential occurs between said two chambers 5 and 6 under dynamic load does this pressure differential bring about opening of the shut-off device, so that additional hydraulic damping medium is able to flow through said channel 8 from one chamber into the other. This is achieved by the radially elastically deformable design of said protective tube 4 fixed at its ends in the area of said overflow channel 8 and by the design of the geometric contour of the throttling strip 9 inside said overflow channel 8 (FIGS. 5 and 6). Various geometries for designing said throttling strip 9 and its cross section and for the arrangement of a plurality of said throttling strips 9 are illustrated in FIGS. 7a–7g.

Figure 7A:
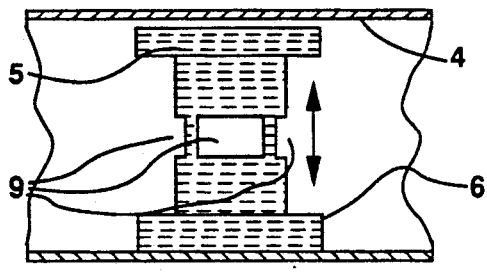
FIGS. 7a-7g are views of different geometries for the design of the shut-off devices in the overflow channel according to the invention shown on a scale different from the scale of FIGS. 1-4; and, FIGS. 8a-8d show sectional according to FIG. 7 through different geometries for the cross sectional design of the outer mounting sleeve.
Figure 7B:
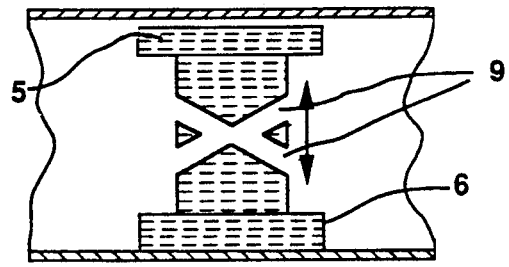
Figure 7C:
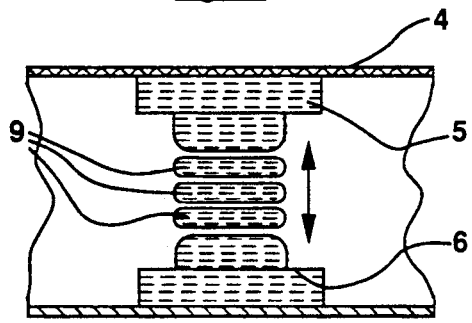
Figure 7D:
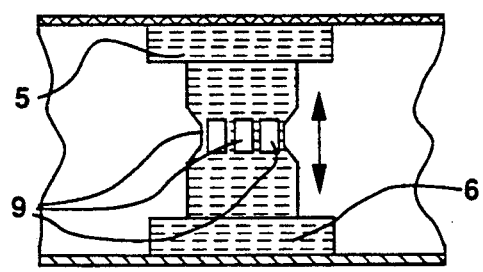
Figure 7E:
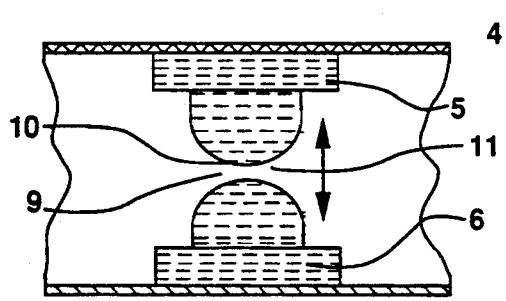
Figure 7F:
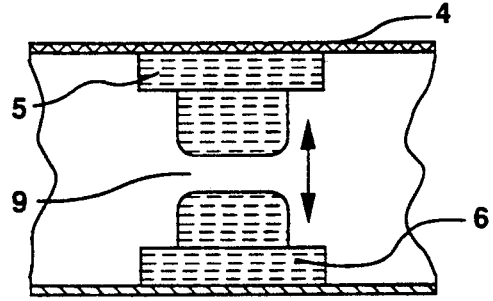
Figure 7G:
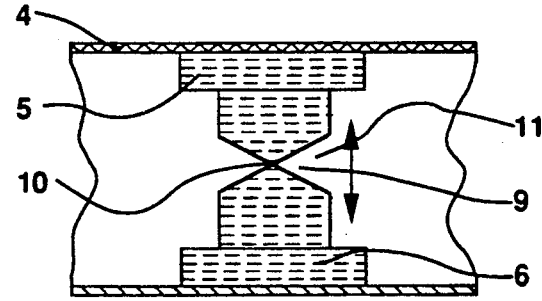

FIG. 7a shows a design in which a throttling strip 9 has one or more permanently open passages of relatively small cross section. FIG. 7b shows two throttling strips 9 in a crossover arrangement. FIG. 7c shows the design of a plurality of throttling strips 9 with relatively small cross sections, arranged one behind another in the direction of flow. FIG. 7d corresponds essentially to FIG. 7a and shows permanently open passages in the overflow channel with a nearly capillary cross section. FIGS. 7e and 7g show a design of said throttling strip 9 made of two tongues 10 and 11 directed toward each other, whose cross section decreases linearly in an arc-shaped manner or according to FIG. 7g and are advantageously rigidly connected to each other, so that a continuous throttling strip 9 is formed, whose cross section decreases toward the outside from the common center. Such a profile of said throttling strip 9 leads to narrowing of the cross section of said overflow channel 8 and consequently to an increase in the pressure at the overflow point, by which the damping characteristics can be influenced. Finally, FIG. 7f shows a throttling strip 9 whose cross section remains constant over its length, and which meets simple requirements.

Figure 8A:
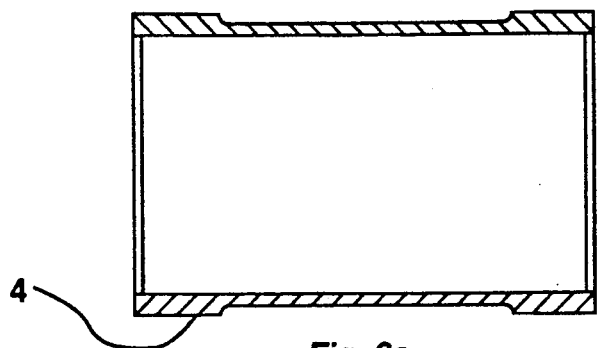
Figure 8B:
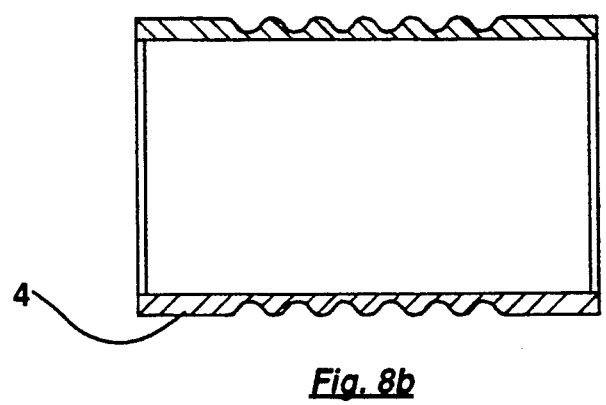
Figure 8C:
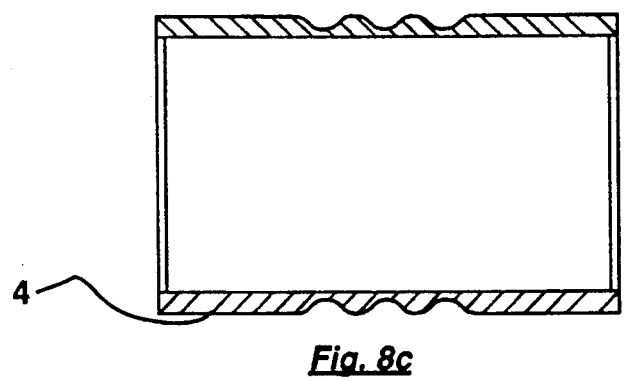
Figure 8D:
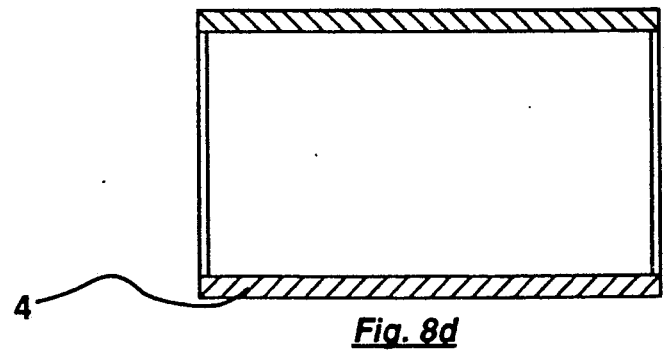

In the embodiments, said throttling strip 9 or said throttling strips 9 in said overflow channel 8 is/are made in one piece with said rubber body 3. Said throttling strip 9 is in loose contact with the inner circumference of said protective tube 4, so that said protective tube 4 expands while undergoing elastic deformation in the case of a predetermined pressure differential between the inner spaces of said two chambers and permits damping fluid to flow over from one of said chambers into the other. This breathing movement of the radially deformable area of said protective tube 4 can be adapted to different operating conditions by selecting different geometries for the cross section and the longitudinal section of said outer protective tube 4. Examples of different profiling of said outer protective tube in the elastically deformable area are shown in FIGS. 8a–8d. FIG. 8a shows a cylindrical wall in the radially elastically deformable area, which extends, in the example in FIG. 8b, over a greater axial length than in the example according to FIG. 8c. Finally, FIG. 8d shows a protective tube 4 with a cylindrical cross section extending over its entire axial length; this protective tube is made of plastic or metal.

By selecting other profiling, it is possible to determine the characteristic with which the bulging of said protective tube 4 takes place in the radial direction under stochastic loads. Such an arrangement may also be selected in conjunction with elastic deformability of said throttling strip 9.

Figure 1:
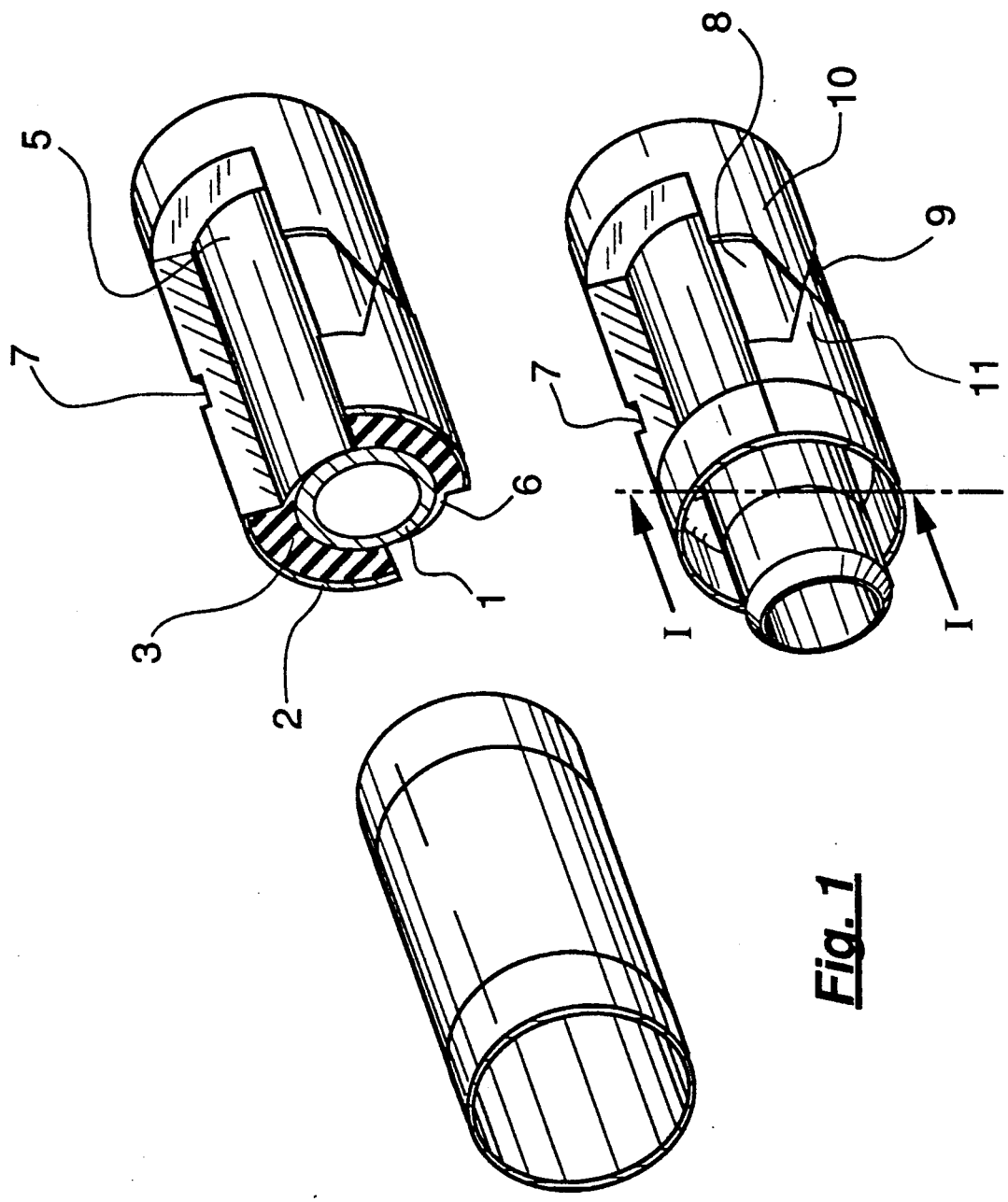
FIG. 1 is an exploded view of a sleeve rubber spring according to the invention with a section taken along line I—I.
Figure 2:
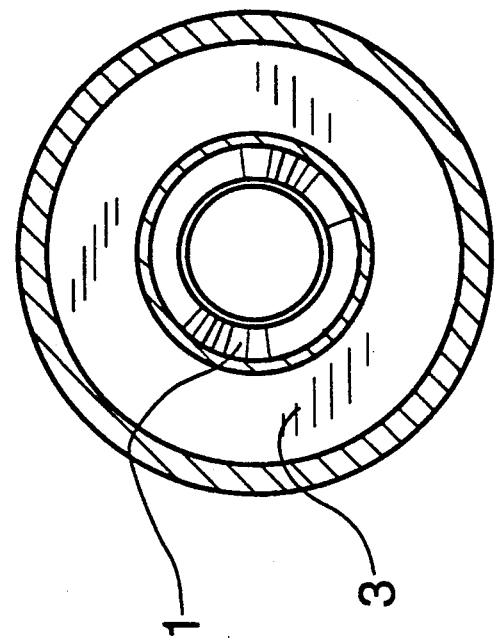
FIG. 2 is a front view of the sleeve rubber spring of FIG. 1.
Figure 3:
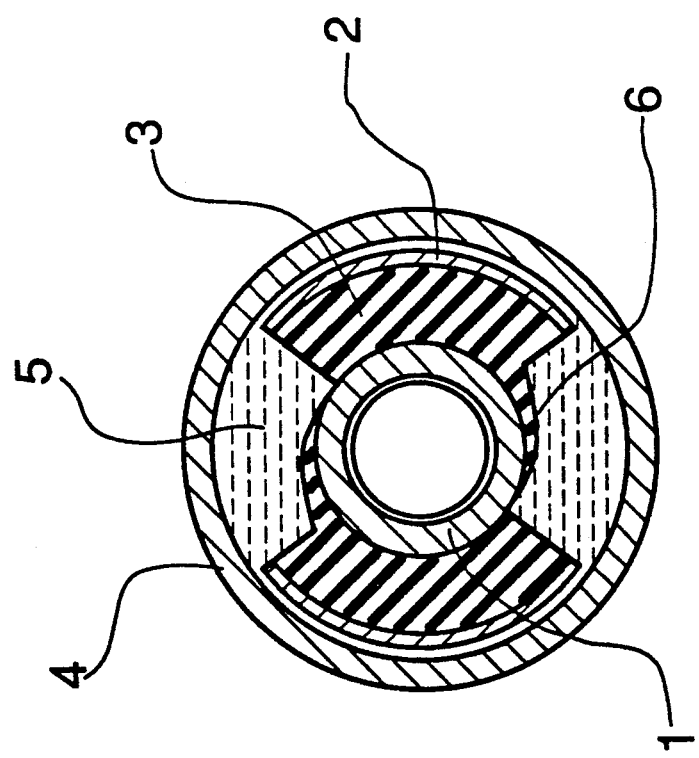
FIG. 3 is an approximately central cross sectional view of the sleeve rubber spring of FIG. 1.
Figure 4:
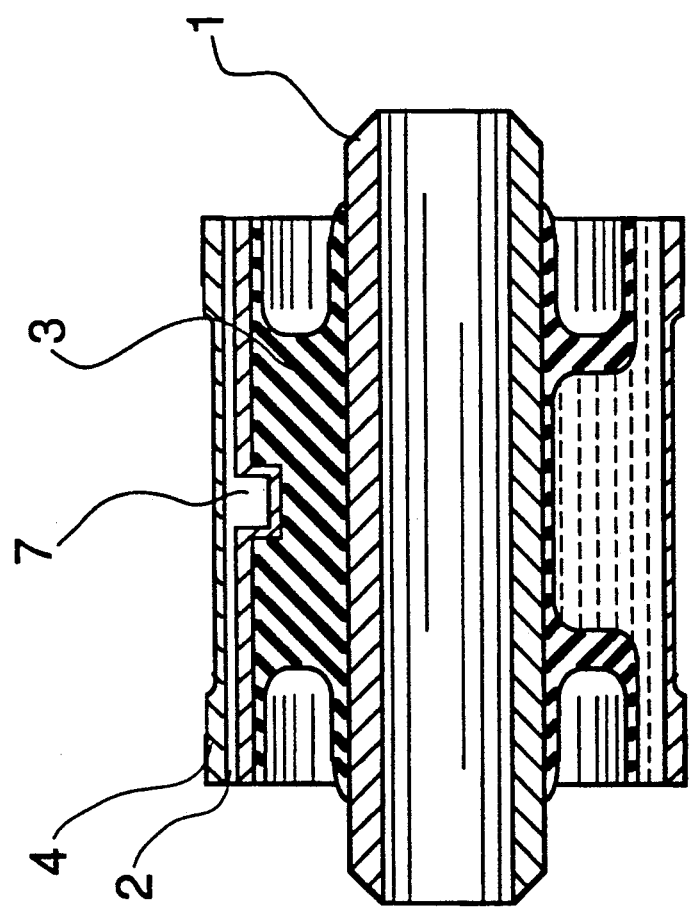
FIG. 4 is a longitudinal sectional view taken along line IV—IV in FIG. 2.

Thus, the mode of operation is as follows:

Under the load exerted by vibrations with relatively small amplitude in the axial and radial directions Fx, Fy, and Fz (see FIGS. 3 and 4) on a sleeve rubber spring designed with the characteristics according to the present invention, the volume of the two chambers 5 and 6 changes, so that a pressure differential develops in the two chambers relative to one another, and hydraulic damping medium flows over from one chamber into the other through said throttle channel 7. Said throttle channel is designed in the conventional manner for these small amplitudes. When vibrations with large amplitudes are introduced, and correspondingly increased pressure differentials develop between the two chambers, the shut-off device in said overflow channel 8 comes into action as a function of the pressure differential. Exchange of fluid between said chambers 5 and 6 can now also take place via said overflow channel. As a result, a slight dynamic stiffening of the mounting system is brought about in the case of vibrations with relatively large amplitude.

While specific embodiments of the invention have been shown and described in detail to illustrate the application of the principles of the invention, it will be understood that the invention may be embodied otherwise without departing from such principles.

What is claimed is:

1. A sleeve rubber spring with hydraulic damping for mountings in motor vehicles, comprising:
    an inner mounting sleeve;
    an outer mounting sleeve, said outer mounting sleeve surrounding said inner mounting sleeve at a location spaced radially from said inner mounting sleeve;
    a rubber body positioned between said inner mounting sleeve and said outer mounting sleeve, said rubber body being adhered to at least one of said inner mounting sleeve and said outer mounting sleeve, said rubber body defining at least two chambers filled with hydraulic damping medium, and said chambers being provided permanently in communication with one another through a first throttle channel, said rubber body defining at least one overflow channel and a shutoff device for shutting said at least one overflow channel, said shut-off device opening only at a predetermined pressure differential between said chambers;

a protective tube, said mounting sleeves being sealingly inserted into said protective tube, said protective tube being fixed at its ends and having a radially deformable portion positioned in the area of said overflow channel such that radial deformations of said protective tube bring about an opening of said shut-off device in said overflow channel.

2. A sleeve rubber spring according to claim 1, wherein said shut-off device in said overflow channel is formed by a fixed throttling strip, said fixed throttling strip acting loosely against a radially deformable counter surface of said protective tube.

3. A sleeve rubber spring according to claim 2, wherein said throttling strip is molded on said rubber body between said inner and said outer mounting sleeves and is in contact with the radially outwardly deformable area of said protective tube.

4. A sleeve rubber spring according to claim 3, wherein said throttling strip of said overflow channel is formed by two tongues, said tongues extending into said overflow channel and forming mutually opposite sides, said sides having cross sectional areas which taper in a direction toward a common center.

* * * * *